Patented Jan. 4, 1944

2,338,681

UNITED STATES PATENT OFFICE 2,338,681

REACTION OF ACRYLAMIDE WITH CELLULOSE

Louis H. Bock, Huntingdon Valley, and Alva L. Houk, Philadelphia, Pa., assignors to Röhm & Haas Company, Philadelphia, Pa., a corporation of Delaware No Drawing. Application January 17, 1942, Serial No. 427,203

4 Claims. (Cl. 260—231)

This invention concerns a process for preparing cellulose derivatives soluble in aqueous media. It also deals with products which result from the interaction of cellulose and acrylamide in the presence of an alkaline catalyst.

It has been found that acrylamide reacts with cellulose in the presence of an alkaline catalyst to yield cellulose ethers. The reaction is performed in a simple fashion by mixing cellulose, strongly basic water-soluble hydroxide, and acrylamide at a temperature between about 0° C. and about 40° C.

The reaction may be effected with different types of cellulose, including cotton, regenerated cellulose, wood pulp from which such impurities as resin and lignin have been removed, or cellulose from bast fibers such as linen.

As an alkaline catalyst there may be used an alkali metal hydroxide, such as sodium or potassium hydroxide, or a strongly basic quaternary ammonium hydroxide, such as benzyl trimethyl ammonium hydroxide, dibenzyl dimethyl ammonium hydroxide, tetraethyl ammonium hydroxide, etc., or mixtures of hydroxides. Concentrations from about 10% to about 40% may be used, the optimum concentrations falling between 20% and 30%.

Acrylamide may be used as such or it may be added to the reaction mixture in the form of an acid salt, such as acrylamide sulfate, $$CH_2=CHCONH_2 \cdot H_2SO_4$$

which may be obtained directly from hydrolysis of acrylonitrile in the presence of sulfuric acid.

The reaction is preferably accomplished by mixing the cellulose in a fibrous or comminuted form with a solution of the alkaline catalyst and then adding acrylamide to this mixture. Alternatively, the cellulose, alkaline catalyst, and acrylamide may be mixed simultaneously. The acrylamide should be used in a proportion of at least 0.2 mol of acrylamide for each glucose unit of the cellulose. With proportions between 0.2 and about 1 mol of acrylamide per glucose unit of the cellulose, the resulting product is primarily soluble in dilute caustic alkali solutions. When larger proportions of acrylamide are used, the resulting product becomes soluble in water, but it should be noted that there is no sharply defined proportion below which the product is exclusively soluble in alkali and above which the product is water-soluble. In general, between about 0.5 mol and about 1 mol of acrylamide per glucose unit, the nature of the product depends not only upon proportions but also upon other conditions of reaction, including temperature, concentration of hydroxide, and time of mixing.

The product which is obtained by the reaction of cellulose and acrylamide is a cellulose ether in which carbamylethyl groups have been substituted for hydrogen atoms of cellulose hydroxyl groups. Some of the amide groups remain intact while others are hydrolyzed. As the degree of hydrolysis will vary with conditions, the nitrogen content of the final products will also vary.

The reaction product may be used in the form of an alkaline solution or, if a water-soluble product, in the form of a solution in water. On the other hand, if desired, the carboxyethyl cellulose ethers may be precipitated from their reaction mixtures or solutions by the addition thereto of water-miscible organic solvents such as methanol or acetone. The precipitated product may be washed free from impurities and dried.

The invention is illustrated by the following examples:

Example 1

170 parts of alpha flock and 275 parts of a 30% aqueous solution of sodium hydroxide were mixed for three hours at 30° C. in a Werner-Pfleiderer mixer. The mixture was then cooled to 10° C. and a solution of 28 parts of acrylamide in 72 parts of water was added. Mixing was continued and the temperature was brought gradually to 30° C. over a period of three hours. The mixture was then diluted with 1652 parts of 5.25% sodium hydroxide solution. The resulting solution contained 8% cellulose and 8% sodium hydroxide as a viscous, slightly turbid solution. The reaction product could be precipitated with dilute acids and the precipitated product was insoluble in water. It redissolved in 8% sodium hydroxide solution.

Example 2

170 parts of alpha flock and 400 parts of a 20% sodium hydroxide solution were mixed in a Werner-Pfleiderer mixer and cooled to 10° C. A solution of 88.7 parts of acrylamide in 130 parts of water was added and mixing was continued for four hours at 10° C. The product was neutralized with acetic acid and diluted to a concentration of six per cent. of the reaction product of cellulose to give a clear, viscous solution. This solution was not affected by boiling.

Example 3

170 parts of alpha flock and 275 parts of a 30% aqueous solution of sodium hydroxide (2.09 mols) were mixed for two hours at room temperature. This mixture was cooled to 10° C. and 71 parts of acrylamide was added and the resulting mixture was stirred for one hour at 10° C. and then for two hours at 30° C. 1.69 mols of acid was necessary for neutralization, indicating that .4 mol of alkali had been used in hydrolyzing the amide group. The reaction product was precipitated by adding methanol, was well washed with methanol, and was dried. The product was soluble in water and from analysis contained 1.12% of nitrogen and yielded 6.15% of ash.

*Example 4*

Alkali cellulose was prepared from 170 parts of 40-mesh alpha flock and 267 parts of 30% sodium hydroxide and allowed to stand in a closed vessel for 16 hours at 25° C. The alkali cellulose was then put into a Werner-Pfleiderer mixer, and a solution of acrylamide made by neutralizing 104 parts of the crude sulfuric acid salt of acrylamide with 20% sodium hydroxide was added slowly. Mixing was continued for 1½ hours at room temperature, after which the batch was diluted with 147 parts of 50% sodium hydroxide and 1363 parts of water. It formed a turbid, viscous solution.

*Example 5*

A mixture of 170 parts of 40-mesh alpha flock and 400 parts of 50% sodium hydroxide was cooled to 12° C. and 261 parts of the crude sulfuric acid salt of acrylamide dissolved in 100 parts of water was added. Mixing was continued at 12–15° C. for six hours, after which the batch was diluted with 1800 parts of water and was neutralized with hydrochloric acid. A thick, somewhat turbid solution resulted.

*Example 6*

Alkali cellulose, comprising 170 parts of alpha flock and 400 parts of 20% sodium hydroxide, was aged for 16 hours at 25° C. To this was added 24 parts of powdered sodium hydroxide and 104 parts of the crude sulfuric acid salt of acrylamide. The batch was mixed in a Werner-Pfleiderer mixer for three hours at 25° C., then diluted with 147 parts of 50% sodium hydroxide and 1363 parts of water. The resulting solution contained 8% caustic and 8% cellulose derivative. It was viscous and fairly turbid. It was precipitated by pouring it into dilute acid. The precipitate could be redissolved in 8% sodium hydroxide to form a viscous solution.

*Example 7*

To 17 parts of 40 mesh alpha cellulose flock was added 40 parts of 20% sodium hydroxide and 35.5 parts of acrylamide. The mixture was kneaded at 0–10° C. for one hour, then warmed to room temperature and kneaded for two hours. 13 parts of water was added to facilitate mixing, and the resulting mixture was stirred for one hour at room temperature. It became very doughy. It was washed in methanol until free of caustic, and dried. The dried product, amounting to 17.6 parts, was soluble in water, giving a slightly turbid solution, and was swelled to a considerable degree in 75% acetic acid. Analysis showed the presence of 4.37% of nitrogen and 3.08% of ash. In this way, a carboxyethyl cellulose was prepared in which a large part of the amide groups remained intact.

The reaction products from the reaction of cellulose and acrylamide in the presence of an alkaline catalyst are useful as thickening agents, protective colloids, sizing agents, and the like.

We claim:

1. The process of preparing cellulose ethers having both O-carbamylethyl and O-carboxyethyl groups which comprises reacting by mixing between about 0° C. and about 40° C. cellulose and at least 0.2 mol of acrylamide for each glucose unit of the cellulose in the presence of a free, water-soluble, strongly basic hydroxide in an aqueous solution of 10% to 40% concentration until carbamylethyl groups are introduced into the cellulose and continuing the reaction until part of the said carbamylethyl groups has been hydrolyzed.

2. The process of preparing cellulose ethers having both O-carbamylethyl and O-carboxyethyl groups which comprises reacting by mixing between about 20° C. and about 30° C. cellulose and at least 0.2 mol of acrylamide for each glucose unit of the cellulose in the presence of free sodium hydroxide in an aqueous solution of 20% to 30% concentration until carbamylethyl groups are introduced into the cellulose and continuing the reaction until part of the said carbamylethyl groups has been hydrolyzed.

3. The process of preparing carbamylethyl cellulose ethers which comprises reacting by mixing between about 0° C. and about 40° C. cellulose and at least 0.2 mols of acrylamide for each glucose unit of the cellulose in the presence of a free, water-soluble, strongly basic hydroxide in an aqueous solution of 10% to 40% concentration until carbamylethyl groups are introduced into the cellulose.

4. The process of preparing carbamylethyl cellulose ethers which comprises reacting by mixing between about 20° C. and about 30° C. cellulose and at least 0.2 mols of acrylamide for each glucose unit of the cellulose in the presence of free sodium hydroxide in an aqueous solution of 20% to 30% concentration until carbamyletthyl groups are introduced into the cellulose.

LOUIS H. BOCK.
ALVA L. HOUK.